United States Patent [19]

Ootmar Ten Cate et al.

[11] Patent Number: 5,525,025

[45] Date of Patent: Jun. 11, 1996

[54] LOADING/UNLOADING APPARATUS ON A VEHICLE AND METHOD THEREFOR

[75] Inventors: Jan Ootmar Ten Cate, Baarn; Vincent J. Mol, Hilverson, both of Netherlands

[73] Assignee: Industrial Contractors Holland B.V., Netherlands

[21] Appl. No.: 129,192

[22] PCT Filed: Apr. 3, 1992

[86] PCT No.: PCT/EP92/00782

§ 371 Date: Dec. 6, 1993

§ 102(e) Date: Dec. 6, 1993

[87] PCT Pub. No.: WO92/18399

PCT Pub. Date: Oct. 29, 1992

[30] Foreign Application Priority Data

Apr. 10, 1991 [NL] Netherlands ............... 9100632

[51] Int. Cl.⁶ ............................................. B65G 1/04
[52] U.S. Cl. ............. 414/529; 414/507; 414/539; 414/222; 414/273; 198/574; 198/782; 198/345.1; 198/791; 901/47; 180/167
[58] Field of Search ................ 901/47; 414/498, 414/495, 390, 395, 396, 398, 401, 507, 518, 522, 222, 523, 529–536, 539, 573, 572, 584, 343, 608, 402, 786, 273; 180/167, 168, 169; 198/780, 781, 791, 586, 594, 861.1, 345.1, 784; 364/478

[56] References Cited

U.S. PATENT DOCUMENTS

| | | | |
|---|---|---|---|
| 3,370,727 | 2/1968 | Shaw | 414/495 |
| 3,374,878 | 3/1968 | Kornylak | 198/782 |
| 3,750,804 | 7/1973 | Lemelson. | |
| 4,492,504 | 1/1985 | Hainsworth | 414/273 |
| 4,566,837 | 1/1986 | Shiomi et al. | 414/222 |
| 4,657,463 | 4/1987 | Pipes | 414/498 X |
| 4,679,149 | 7/1987 | Merz | 414/273 X |
| 4,679,977 | 7/1987 | Minami | 198/574 X |

FOREIGN PATENT DOCUMENTS

| | | | |
|---|---|---|---|
| 0064179 | 10/1982 | European Pat. Off. . | |
| 2450765 | 11/1980 | France | 198/574 |
| 135354 | 10/1981 | Japan | 414/495 |
| 247800 | 11/1969 | U.S.S.R. | 414/401 |
| 1257023 | 9/1986 | U.S.S.R. | 198/782 |
| 2220183 | 4/1990 | United Kingdom . | |

OTHER PUBLICATIONS

Patent Abstracts of Japan vol. 9, No. 245 (M-418) (1968) 2 Oct. 1985 & JP,A,60 097 113 (Daifuku Kiko K.K.) 30 May 1985.

*Primary Examiner*—Frank E. Werner
*Attorney, Agent, or Firm*—Ostrolenk, Faber, Gerb & Soffen

[57] ABSTRACT

A loading/unloading apparatus used in conjunction with stations from which or to which objects are loaded or unloaded. The loading/unloading apparatus includes a pickup/receiving member which is used in the transfer of objects to and from the stations. The pickup/receiving member includes one or more driven roller elements which are arranged close to an end of the pickup receiving member and which are utilized in the transfer of the object either to or from the station. The loading/unloading apparatus also includes moving devices for moving the pickup/receiving member in a translational direction along a longitudinal axis of the pickup member either towards or away from the station. The loading/unloading apparatus is particularly adapted for use with passive loading/unloading stations which are not provided with electrical power.

19 Claims, 4 Drawing Sheets

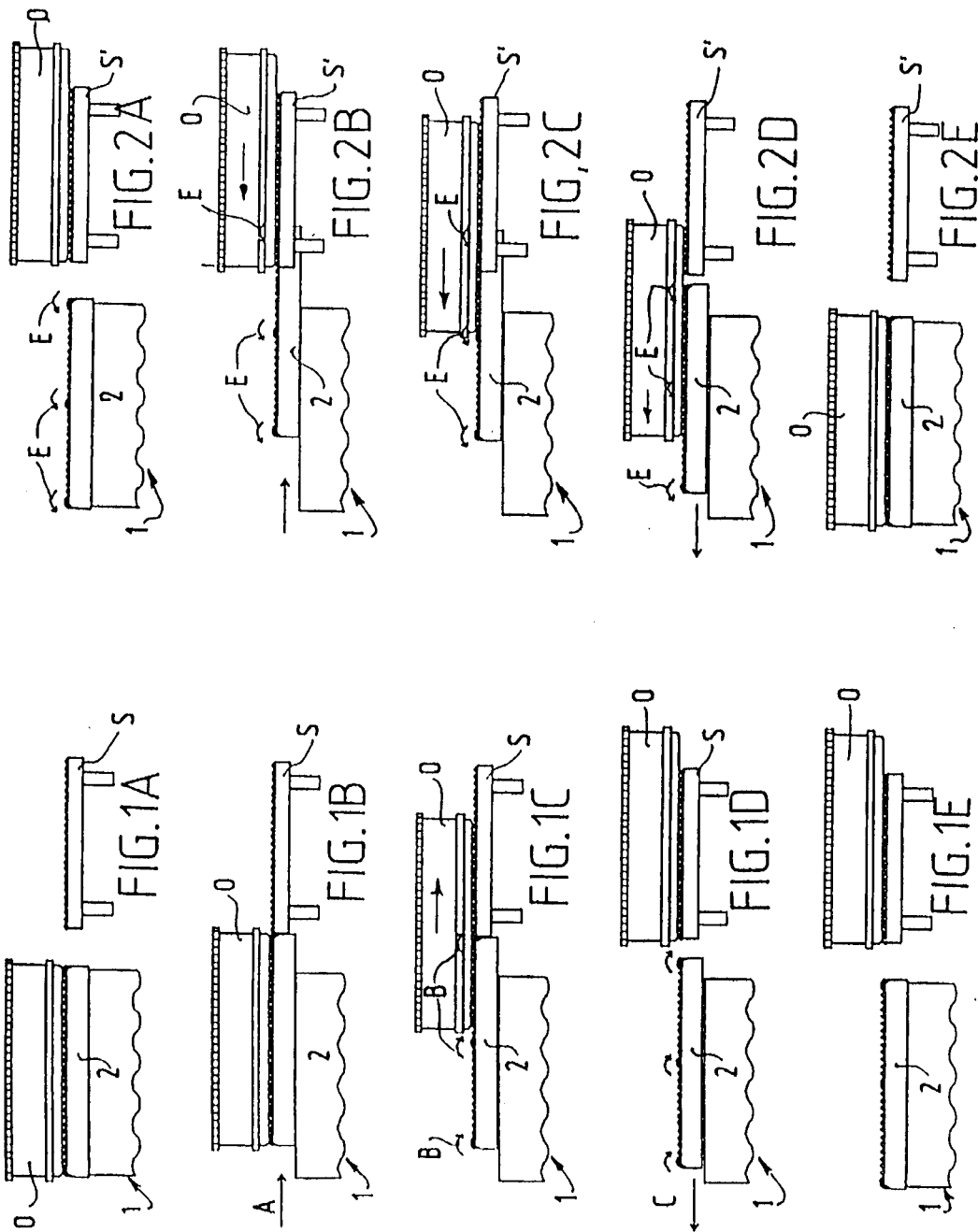

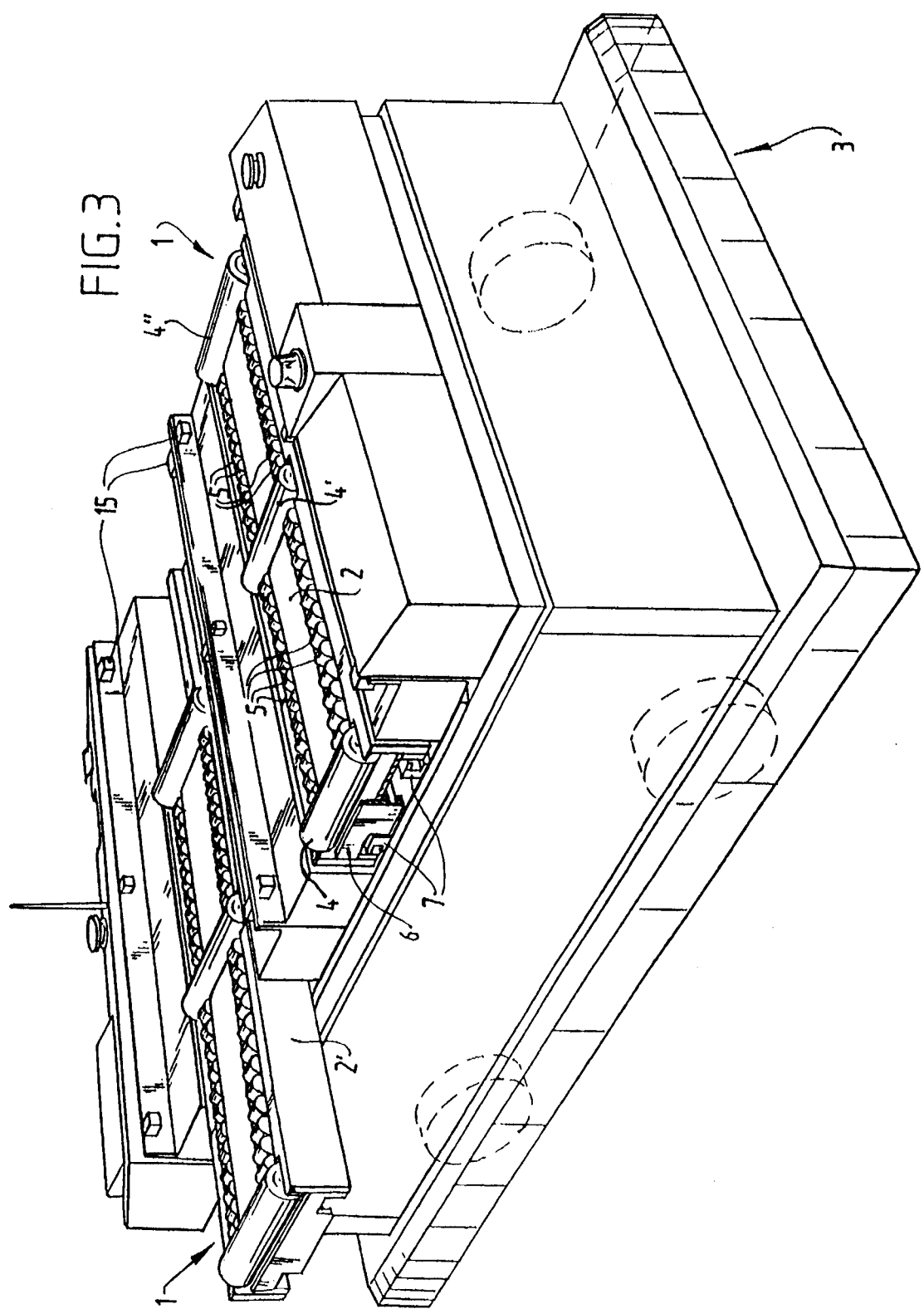

LOADING/UNLOADING APPARATUS ON A VEHICLE AND METHOD THEREFOR

This application is a 371 of PCT/EP92/00782 filed Apr. 3, 1992, now Patent No. WO 92/68399.

Particularly in factory areas in which objects such as holders with components for assembly and the like are transported between different stations by often unmanned vehicles, a need has made itself felt for freely disposable so-called passive loading/unloading stations where objects can be loaded and unloaded without the stations having to be provided with an electricity supply. Conditions in such spaces are in any case subject to change.

The present invention provides an apparatus for loading/unloading one or more objects, comprising:
- a pick-up/receiving member for picking up/receiving the objects; and
- moving means for causing the pick-up member to move to and from a loading/unloading station; wherein the pick-up member is provided with one or more driven roller elements which are arranged close to an end of the pick-up member and which engage onto the objects and which transfer the objects respectively to and from the loading/unloading station and from and to the pick-up member.

U.S. Pat. No. 3,750,804 shows a warehouse system comprising a storage rack and a stacker crane. Loads on the storage rack are conveyed to a transfer mechanism which is operated electrically. The weight of a load is used for transferring it to the crane. The storage rack is therefore not a completely passive station and the crane is not actively picking up a load from the rack.

With the apparatus according to the present invention it is possible to load and unload objects from the above mentioned passive stations while the apparatus is also usable when loading and unloading objects to and from active loading stations or roller conveyors such as for example those provided with driven rollers which are mutually connected.

The pick-up member is preferably arranged on a single—i.e. non-telescopic—carriage. Because a driven roller is arranged on the end of the pick-up member, an object is transported by this roller onto the carriage and the carriage does not have to be placed accurately positioned as a whole under such an object or article.

The loading/unloading apparatus is preferably provided with an electric motor driven via a transmission mechanism, which transmission mechanism is available for example under the name Roh'lix®. The transmission mechanism enables a compact embodiment of the moving means while there is no need to fear damage to the electric motor since the smooth shaft can practically never jam.

The roller element is preferably a continuous roller in which an electric motor is received which further enables compact construction of the apparatus according to the present invention.

During loading/unloading an object is preferably slightly lifted relative to the loading/unloading station by the driven roller. By for example driving the roller during movement of the moving means the driven roller presses itself under the object, wherein the object is lifted. The object is then pulled "on board" by the movement of the driven roller.

The present invention further provides a vehicle with an apparatus according to the present invention.

The present invention also provides a loading/unloading station which can be utilized well in combination with the apparatus and/or vehicle of the present invention while this loading/unloading station requires no electricity supply.

Further advantages, features and details of the present invention will become apparent in the light of the following description of a preferred embodiment thereof with reference to the following figures, in which:

FIG. 1A–1E show side views in schematic form of an apparatus according to the present invention during unloading of an object;

FIG. 2A–2E show side views in schematic form of loading of an object on a preferred embodiment of FIG. 1A–1E;

FIG. 3 shows a perspective view of a vehicle provided with a preferred embodiment of the apparatus according to the present invention;

Figure 4:
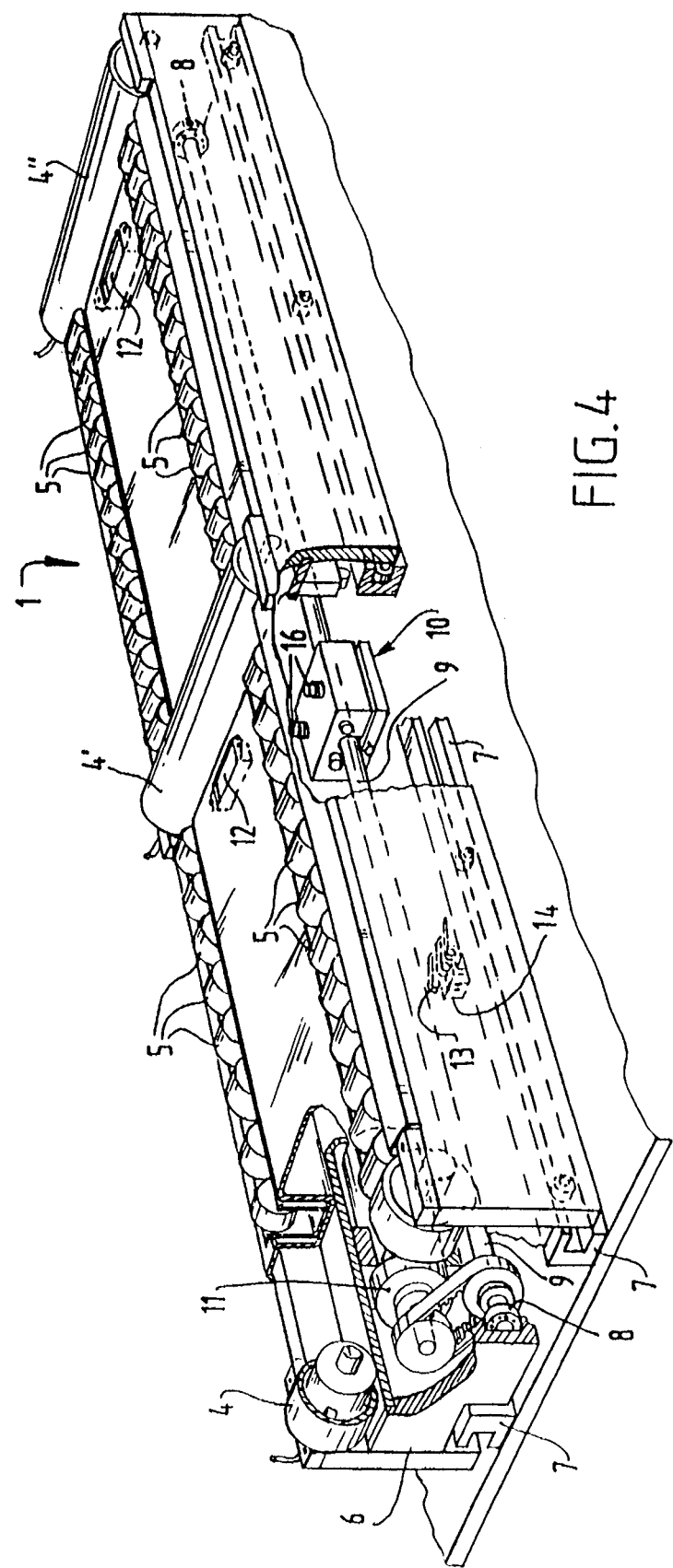
FIG. 4 shows a partially broken away perspective view of a detail of FIG. 3.

An apparatus 1 for loading/unloading an object O (FIG. 1A) such as a crate with components for assembly (mass e.g. 50–100 kg.) comprises a pick-up member 2 that is provided on the top side with roller elements on which the object O rests. When the object 0 is transported to a station S for unloading, the pick-up member 2 is placed up against the station S according to the arrow A (FIG. 1B), whereafter at least a number of roller elements are set into movement (as schematically indicated by the arrows B in FIG. 1C). Once the object O is situated wholly on the station S the pick-up member 2 is carried according to arrow C (FIG. 1D) back into its neutral position, as can be seen in FIG. 1E.

When an object O is loaded (FIG. 2A) from a station S' onto loading/unloading apparatus 1 the pick-up member 2 (FIG. 2B) is placed according to arrow D under the object O, wherein a number of roller elements are simultaneously set into motion as indicated by arrows E, wherein it is preferred that the translation speed of the pick-up member 2 and the rotation speed of the roller element shown furthest to the right in FIG. 2B are substantially equal to one another, so that the object O comes to a standstill and thus remains correctly positioned with respect to the pick-up member 2. Once the roller element furthest to the right of the pick-up element 2 is situated slightly under the object O—the station S' is provided with an interspace for the pick-up member 2—the translation movement of the pick-up member 2 is stopped and the object O is transported onto the pick-up member 2 by the driven roller element (FIG. 2C). When the object O is situated for instance up to half way above the pick-up member 2 the loading of the object O is preferably accelerated by returning translation movement to pick up member 2 as indicated by arrow F in FIG. 2D. The position shown in FIG. 2E is then reached, which is the same as the position in FIG. 1A.

The vehicle 3 shown in FIG. 3 is provided with two loading/unloading apparatus 1, 1' according to the present invention. Such a vehicle is capable of moving independently towards a desired position. The control system of the vehicle has available for this purpose a floor plan of the work area available for this and is therewith capable of planning a route to the desired position. The flexibility in the use of passive loading/unloading stations is thus well utilized in combination with the above mentioned vehicles.

The vehicle is further preferably provided with sensor mean (not shown)—e.g. optical sensors—which are arranged on the side of such a vehicle for positioning the loading/unloading apparatus 1 in correct manner with respect to stations likewise not shown in FIG. 3. The loading/unloading apparatus 1, 1' is preferably provided with roller elements 4 and 5, wherein the driven roller elements 4, 4', 4" are continuous rollers of non-slip material in which an electric motor is received and the rollers 5 are passive, i.e. non-driven. The roller elements 4, 5 are mounted to a carriage 6 which is guided on the vehicle along guide rails 7.

A smooth shaft 9 rotated by means of a drive belt 10 and an electric motor 11 is further fixed to the carriage 6 in bearings 8. The rotation of the smooth shaft 9 is converted into a translation movement of the carriage 6 by means of a transmission mechanism 10 of the commercially available type Roh'lix®, with which clamping of the smooth shaft, and thereby the degree of permitted slip, can be adjusted by means of adjusting the screw bolts 16. It is therefore precluded that the shaft 9 and the electric motor 11 jam.

The apparatus 1 is further provided with sensor elements 12, for instance of the capacitive type which record whether or not an object is situated above these sensor elements, which information is passed to a control part not further shown here. Such information can also be obtained by means of optical sensors 15 designated schematically in FIG. 3. Information can further be transmitted to this control part (not shown) relating to the position of the carriage relative to the rails by means of schematically designated switch elements 13 which react to a corresponding number of protruding elements or cams 14, one of which is shown and which are fixed to the carriage 6. The slide-out position can be adjusted for different conditions by moving these elements.

Figure 5:
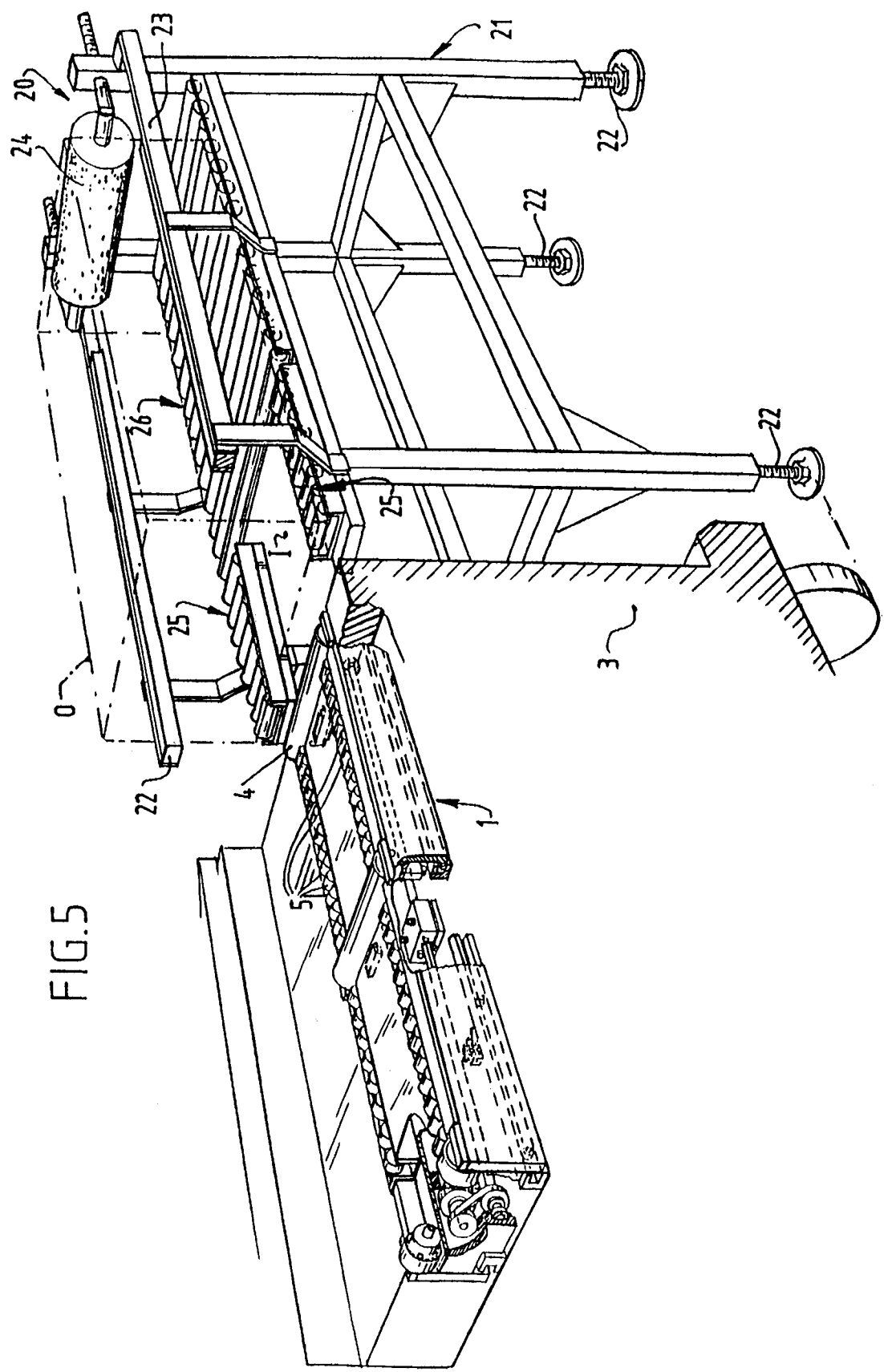
FIG. 5 is a view in perspective of a vehicle provided with a loading/unloading apparatus according to the present invention in co-action with a loading/unloading station according to the present invention.

A passive loading/unloading station 20 (FIG. 5) comprises a frame 21 with height-adjustable legs 22, guide members 23, a stop element 24 and (non-driven) roller elements 25, 26, wherein an interspace I is left free for a roller 4 of a loading/unloading apparatus according to the present invention. The roller 4 is situated at a slightly higher level than roller elements 25, 26 and 5.

The preferred embodiments of the present invention described and shown here comprise the following advantages:

the carriage only needs to slide out partially e.g. 40%, which reduces lead on the carriage and rails;

the carriage is a single entity and does not have to take a telescopic form;

the construction of the carriage is very compact, e.g. 10–20 cm high;

the electric motor will not jam;

the loading/unloading apparatus shown is symmetrical i.e. can be moved to both sides;

the loading/unloading apparatus can be used at stations either with or without driven roller elements;

an object for loading is lifted up slightly—in the embodiment shown because the driven rollers have a larger diameter than the passive roller elements—wherein the relevant roller "worms" its way under the object.

The rights requested are not however limited to the embodiment but are defined by the following claims.

We claim:

1. An apparatus for unloading an object from the apparatus onto a receiving station or for loading the object from the receiving station and onto the apparatus, the apparatus comprising:

a pickup/receiving member for selectively picking up or receiving an object, the pickup/receiving member having a longitudinal axis;

moving means for moving the pickup/receiving member in a translational direction along the longitudinal axis of the pickup member toward or away from the station;

the pickup/receiving member having opposite ends along its longitudinal axis and having support rollers at least one being a driven roller arranged close to one of the ends of the pickup member; and means for driving the at least one driven roller to rotate the same, the driven roller being provided for engaging an object for transferring the object selectively either to or from the station and respectively from or to the pickup member, the driving means adapted for rotating the driven roller at a rotation speed effectively equal to the translational speed of the pickup/receiving member so that the object is substantially not displaced until transfer is desired; and a base having a guide rail thereon for guiding movement with respect to the base of a carriage and the pickup member supported thereon, and a bearing mounted between the guide rail and the carriage.

2. The apparatus of claim 1, wherein the moving means comprises a motor and a shaft on the carriage which is connected with the motor for being driven to rotate by the motor; means for converting rotary motion of the shaft to axial movement of both the shaft and the pickup member to and from the station.

3. The apparatus of claim 2, wherein the motor is an electric motor and the converting means is a transmission mechanism between the electric motor and the shaft, the transmission mechanism including a mechanism permitting slip therein and permitting an adjustable degree of slip thereby to preclude jamming of the electric motor and shaft.

4. The apparatus of claim 1, wherein each of the driven rollers is a continuous roller which extends transversely of the pickup member and of the object being loaded or unloaded.

5. The apparatus of claim 1, wherein the pickup member has at least first and second driven rollers, with the first driven roller being at one of the ends of the pickup member and the second driven roller being spaced a distance both from the one end of the pickup member and from the first driven roller.

6. The apparatus of claim 5, further comprising a plurality of non-driven, passive roller elements on the pickup member including non-driven roller elements between the first and second driven roller elements.

7. The apparatus of calim 6, wherein the driven roller is supported at a slightly greater height than a loading and unloading surface of the loading and unloading station, such that during unloading of an object from the apparatus, the object is tilted slightly downward relative to the driven roller, and during loading of an object onto the apparatus, the object is lifted slightly from the station, thereby the driven roller better engages the object during loading and unloading.

8. The apparatus of claim 7, wherein the driven roller element has a slightly larger diameter than the non-driven roller elements, and the non-driven roller elements are arranged at approximately a same level as the loading and unloading surface of the station.

9. The apparatus of claim 6, wherein there is a respective driven roller at both ends of the pickup member.

10. The apparatus of claim 9, further comprising a sensor arranged close to each of the driven rollers for sensing a presence or absence of an object at the driven roller.

11. The apparatus of claim 1, wherein the driven roller is supported at a slightly greater height than a loading and unloading surface of the loading and unloading station, such that during unloading of an object from the apparatus, the object is tilted slightly downward relative to the driven roller, and during loading of an object onto the apparatus, the object is lifted slightly from the station, thereby the driven roller better engages the object during loading and unloading.

12. The apparatus of claim 1, wherein there is a respective driven roller at both ends of the pickup member.

13. The apparatus of claim 1, further comprising a sensor arranged close to each of the driven rollers for sensing a presence or absence of an object at the roller.

14. A vehicle including a body of the vehicle and means for conveying the body and further including the apparatus of claim 1 on the body.

15. The vehicle of claim 14, further comprising sensors on the vehicle for selectively positioning the vehicle in relation to the station.

16. The vehicle of claim 15, further comprising second sensors on the vehicle for sensing a presence or absence of an object at the station.

17. The vehicle of claim 14, further comprising sensors on the vehicle for sensing a presence or absence of an object at the station.

18. A method for transporting objects between loading and unloading stations at spaced apart locations by a vehicle capable of moving independently between the stations and including the apparatus of claim 1, comprising supplying the vehicle with a reference to a floor plan which informs the vehicle of the locations of the stations on the floor, and controlling the vehicle to move with reference to the floor plan to positions of the loading and unloading stations.

19. The method of transporting objects of claim 18, wherein the stations are passive stations.

* * * * *